(12) United States Patent
Hou et al.

(10) Patent No.: US 10,400,091 B2
(45) Date of Patent: Sep. 3, 2019

(54) THERMOPLASTIC COMPOSITE, METHOD FOR PREPARING THERMOPLASTIC COMPOSITE, AND INJECTION-MOLDED PRODUCT

(71) Applicants: 3M INNOVATIVE PROPERTIES COMPANY, St. Paul, MN (US); Jingqiang Hou, Shanghai (CN)

(72) Inventors: Jingqiang Hou, Shanghai (CN); Baris Yalcin, Roswell, GA (US); Pu Ren, Shanghai (CN); Yinjie Zhou, Shanghai (CN); Xuchu Jiang, Shanghai (CN); Xuetao Yu, Shanghai (CN)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 0 days.

(21) Appl. No.: 15/523,122

(22) PCT Filed: Oct. 31, 2014

(86) PCT No.: PCT/CN2014/090028
§ 371 (c)(1),
(2) Date: Apr. 28, 2017

(87) PCT Pub. No.: WO2016/065614
PCT Pub. Date: May 6, 2016

(65) Prior Publication Data
US 2017/0321038 A1    Nov. 9, 2017

(51) Int. Cl.
| | |
|---|---|
| C08K 7/28 | (2006.01) |
| C08L 23/06 | (2006.01) |
| C08L 27/06 | (2006.01) |
| C08L 77/02 | (2006.01) |
| C08L 23/10 | (2006.01) |
| C08L 23/04 | (2006.01) |
| C08L 23/12 | (2006.01) |
| C08L 81/04 | (2006.01) |
| C08L 67/02 | (2006.01) |
| C08L 71/12 | (2006.01) |
| C08L 77/06 | (2006.01) |
| C08L 77/10 | (2006.01) |

(52) U.S. Cl.
CPC ............... *C08K 7/28* (2013.01); *C08L 23/04* (2013.01); *C08L 23/06* (2013.01); *C08L 23/10* (2013.01); *C08L 23/12* (2013.01); *C08L 27/06* (2013.01); *C08L 67/02* (2013.01); *C08L 71/12* (2013.01); *C08L 77/02* (2013.01); *C08L 77/06* (2013.01); *C08L 77/10* (2013.01); *C08L 81/04* (2013.01); *C08L 2205/16* (2013.01); *C08L 2205/20* (2013.01)

(58) Field of Classification Search
CPC . C08K 7/28; C08L 23/04; C08L 23/12; C08L 27/06; C08L 81/04
See application file for complete search history.

(56) References Cited

U.S. PATENT DOCUMENTS

| | | | |
|---|---|---|---|
| 2013/0001824 A1 | 1/2013 | Lingannaiah et al. | |
| 2015/0102528 A1 | 4/2015 | Gunes | |
| 2016/0319088 A1* | 11/2016 | Saji | C08J 5/042 |

FOREIGN PATENT DOCUMENTS

| | | |
|---|---|---|
| CN | 102093659 | 6/2011 |
| CN | 102504528 | 6/2012 |
| CN | 103087463 | 5/2013 |
| EP | 0 361 367 A2 | 4/1990 |
| EP | 0 390 147 A2 | 10/1990 |
| EP | 0 449 604 A1 | 3/1991 |
| JP | 2004-123914 | 4/2004 |
| JP | 2005-320467 A | 11/2005 |
| JP | 2006-256258 A | 9/2006 |
| JP | 2011-093972 A | 5/2011 |
| JP | 2011-094056 A | 5/2011 |
| JP | 2013-252642 A | 12/2013 |
| KR | 2012-0106472 | 9/2012 |
| KR | 20130078602 A | 7/2013 |
| WO | WO 2004-087410 | 10/2004 |
| WO | WO 2005/092961 A2 | 10/2005 |
| WO | WO 2008/090235 A2 | 7/2008 |
| WO | WO 2012/030224 A1 | 3/2012 |
| WO | WO 2012-151178 | 11/2012 |

OTHER PUBLICATIONS

3M Microspheres Selection Guide. (2015).*
CN 102504528 machine translation. Original document date Jun. 2012.*
International Search Report for PCT International Application No. PCT/CN2014/090028, dated May 6, 2015, 4pgs.

* cited by examiner

*Primary Examiner* — Edward J Cain
(74) *Attorney, Agent, or Firm* — Thomas M. Spielbauer

(57) ABSTRACT

Provided is a thermoplastic composite, a method for preparing a thermoplastic composite, and an injection-molded product. The thermoplastic composite comprises 35-75% by weight of a thermoplastic resin, 5-45% by weight of a non-cellulosic organic fiber, and 5-20%) by weight of hollow glass microspheres, based on 100% by weight of the total weight of the thermoplastic composite.

13 Claims, 1 Drawing Sheet

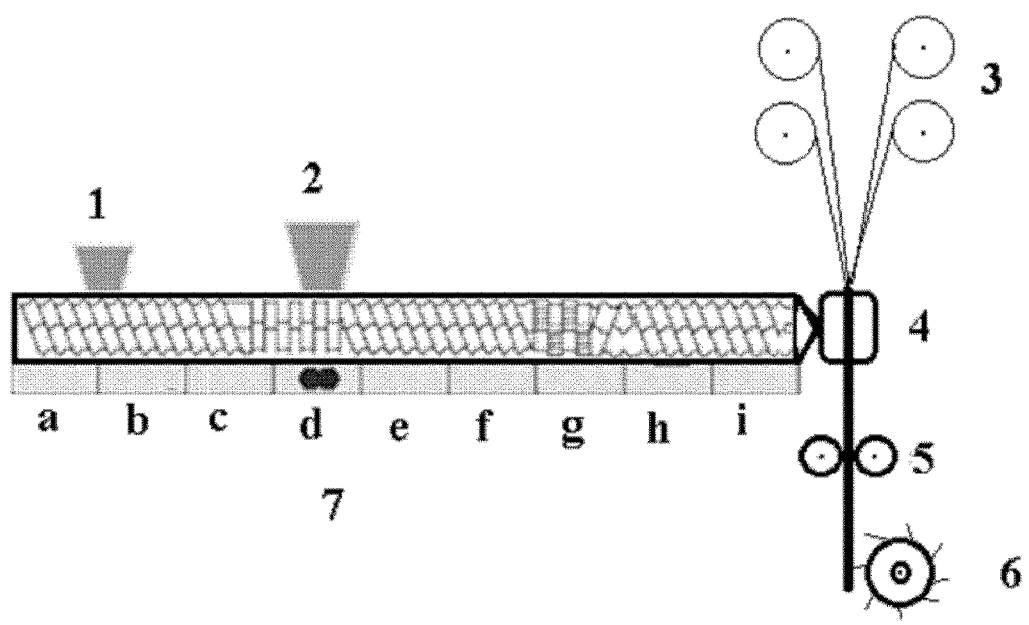

THERMOPLASTIC COMPOSITE, METHOD FOR PREPARING THERMOPLASTIC COMPOSITE, AND INJECTION-MOLDED PRODUCT

CROSS REFERENCE TO RELATED APPLICATIONS

This application is a national stage filing under 35 U.S.C. 371 of PCT/CN2014/090028, filed Oct. 31, 2014, the disclosure of which is incorporated by reference in its entirety herein.

TECHNICAL FIELD

This disclosure relates to the field of thermoplastic composite preparation, and specifically, relates to a thermoplastic composite, a method for preparing thermoplastic composite, and an injection-molded product.

SUMMARY

At present, in the field of the preparation of thermoplastic composites, there is a technical problem urgent to be solved that it is difficult to obtain a thermoplastic composite having all of low density, high modulus, and high toughness (defined herein as having high impact strength as measured by ASTM D256) at the same time after the thermoplastic resin is filled with high-strength hollow glass microspheres. Therefore, it is required to develop a novel thermoplastic composite having low density, high modulus, and high toughness, which is capable of modified by hollow glass microspheres.

In order to address the problem described above, intensive and detailed studies have been performed by the inventor. An object of the present disclosure is to provide a method for preparing a composite using high-strength hollow glass microspheres and a non-cellulosic organic fiber to fill a thermoplastic resin, by which a thermoplastic composite with low density, high modulus, and high toughness can be prepared, and when a supercritical foaming technique is introduced into the injection molding process, the density of the composite may be further reduced while other mechanical properties of the material are maintained. This method is particularly suitable for the preparation and commercialization of light polyolefin composites.

According to an aspect, this disclosure provides a thermoplastic composite, comprising 35-75% by weight of a thermoplastic resin, 5-45% by weight of a non-cellulosic organic fiber, and 5-20% by weight of hollow glass microspheres, based on 100% by weight of the total weight of the thermoplastic composite.

According to another aspect, this disclosure provides a method for preparing a thermoplastic composite, comprising the steps of:

(a) melt-mixing a thermoplastic resin and hollow glass microspheres to obtain a molten mixture; and (b) mixing and impregnating non-cellulosic organic fiber with the molten mixture to obtain a thermoplastic composite containing the thermoplastic resin, the hollow glass microspheres, and the non-cellulosic organic fiber.

According to a further aspect, this disclosure provides an injection-molded product, comprising the thermoplastic composite described above which has been subjected to injection molding.

According to a further aspect, this disclosure provides an injection-molded product, comprising the thermoplastic composite described above which has been subjected to supercritical foaming injection molding.

In some embodiments, technical solutions according to this disclosure have one or more of the advantages that (i) a thermoplastic composite with low density, high modulus, and high toughness can be prepared, and (ii) when a supercritical foaming technique is introduced into the injection molding process, the density of the composite may be further reduced while other mechanical properties of the material are substantially maintained.

BRIEF DESCRIPTION OF THE DRAWING

FIG. 1 is a schematic view showing an apparatus for performing a method of preparing a thermoplastic composite according to an embodiment of the present disclosure.

DETAILED DESCRIPTION

The thermoplastic resin filled with high-strength hollow glass microspheres may improve the thermal shrinkage factor, enhance the rigidity of materials, and reduce the density of materials, and has begun to be applied to automobiles, and the like. However, when the thermoplastic resin modified by high-strength hollow glass microspheres is used, mechanical properties (for example, impact strength, elongation at break, tensile strength, and the like) of the thermoplastic resin would be typically reduced due to the introduction of high-strength hollow glass microspheres.

Thermoplastic Composite

In one embodiment, thermoplastic composites described herein may comprise 35-75% by weight of a thermoplastic resin, 5-45% by weight of a non-cellulosic organic fiber, and 5-20% by weight of hollow glass microspheres, based on 100% by weight of the total weight of the thermoplastic composite.

The thermoplastic composite may employ a thermoplastic resin as the base material. For instance, the thermoplastic resin may be a thermoplastic resin selected from one or more of polypropylene, polyethylene, polyvinyl chloride, polystyrene, an ethylene-vinyl acetate copolymer (EVA), an acrylonitrile-styrene-butadiene copolymer (ABS), and nylon 6. The molecular weight of the thermoplastic resin described above is not particularly limited as long as it is capable of satisfying the essential requirements for the preparation of thermoplastic materials. For instance, the thermoplastic resin may be polypropylene. Commercially available products of the thermoplastic resin include PPK9026 and PPK8003 from Sinopec Limited, China; PP3800, PP3520 and PP3920 from SK Corporation, South Korea; PP3015 from Formosa Chemicals & Fibre Corporation, Taiwan; PPK2051 from Formosa Plastics Corporation, Taiwan; and the like. The content of the thermoplastic resin may, in some embodiments, be 35-75% by weight, 40-65% by weight, or even 48-63% by weight, based on 100% by weight of the total weight of the thermoplastic composite.

According to an embodiment of the present disclosure, a non-cellulosic organic fiber is added to the thermoplastic composite to increase the modulus, the toughness, and the like of the thermoplastic composite. According to some embodiments of the present disclosure, the non-cellulosic organic fiber is one or more selected from a nylon 66 fiber, a polyethylene terephthalate fiber, a polypropylene terephthalate fiber, a polyphenylene sulfide fiber, a polyether ether ketone fiber, and an aramid fiber. The non-cellulosic organic fiber may be further selected from other liquid crystal polymer fibers. In some embodiments, the non-cellulosic organic fiber is a nylon 66 fiber. The molecular weight of the non-cellulosic organic fiber described above is not particularly limited as long as it is capable of satisfying the essential requirements for the preparation of thermoplastic materials. According to some embodiments of the present disclosure, the non-cellulosic organic fiber may be several non-cellulosic organic fibers with a diameter of 5-70 µm, 8-50 µm, or even 15-20 µm. Commercially available products of the non-cellulosic organic fiber include PA (Nylon) 66 fiber T743 (from Invista China Co., Ltd.), which is a nylon 66 fiber with a diameter of 15-20 µm that has not been subjected to surface modification. According to some embodiments of the present disclosure, the content of the non-cellulosic organic fiber may be 5-45% by weight, 10-40% by weight, 15-35% by weight, or even 15-30% by weight, based on 100% by weight of the total weight of the thermoplastic composite.

According to some embodiments of the present disclosure, the higher melting peak (as measured in differential scanning calorimetry or DSC) of the non-cellulosic organic fiber should be 60° C. or more, 70° C. or more, or even 80° C. or more higher than that of the thermoplastic resin in order to achieve the object of the present disclosure for obtaining a thermoplastic composite with high modulus, high toughness, and low density. According to some embodiments of the present disclosure, hollow glass microspheres are added to the thermoplastic composite to decrease the density of the thermoplastic composite. The hollow glass microspheres have an average particle diameter of 5-100 µm, 5-80 µm, or even 10-50 µm. In addition, the hollow glass microspheres have a density of 0.3-0.8 g/cm$^3$, 0.3-0.7 g/cm$^3$, or even 0.4-0.6 g/cm$^3$. Furthermore, the hollow glass microspheres have a compressive strength greater than 37.9 MPa, in some embodiments greater than 48.3 MPa, in some embodiments greater than 55.2 MPa, or in some embodiments greater than 70.0 MPa. Commercially available products of the hollow glass microspheres include IM16K from 3M Corporation, which has an average particle diameter of 20 µm, a density of 0.46 g/cm$^3$, and a compressive strength of 113.8 MPa. According to some embodiments of the present disclosure, the content of the hollow glass microspheres is 5-20% by weight, 5-15% by weight, or even 5-10% by weight, based on 100% by weight of the total weight of the thermoplastic composite. It should be illustrated that when the thermoplastic composite comprises 15-30% by weight of non-cellulosic organic fiber and 5-10% by weight of hollow glass microspheres based on 100% by weight of the total weight of the thermoplastic composite, the toughness of the resultant thermoplastic composite is quite excellent.

In addition to the components described above, the thermoplastic composite further comprises other auxiliaries used for improving various properties of the prepared thermoplastic composite. The auxiliaries include an inorganic filler used for improving mechanical properties of the material; a compatibilizer used for enhancing the compatibility between respective components in the composite; a toughener used for enhancing the toughness of the composite; a antioxidant used for improving antioxidant properties of the composite; or the like. Thus, the thermoplastic composite may further comprise one or more of an inorganic filler, a compatibilizer, a toughener, an antioxidant, and the like.

The inorganic filler may be one or more selected from a glass fiber, a carbon fiber, a basalt fiber, talc, montmorillonite, and the like.

The compatibilizer may be selected from the compatibilizers in the art typically used for performing compatibilization on composites. In some embodiments, the compatibilizer is maleic anhydride grafted polypropylene. Commercially available products of the compatibilizer include polypropylene grafted maleic anhydride from Shanghai Yuanyuan Polymer Co., Ltd.

The toughener may be selected from the tougheners in the art typically used for toughening composites. In some embodiments, the toughener is polyethylene and a polyolefin elastomer. Commercially available products of the toughener include polyethylene from Sinopec Limited, China and polyolefin elastomer from Dow Corporation.

The antioxidant is not particularly limited, and it may be selected from antioxidants in the art typically used for composites. In some embodiments, the antioxidant is one or more selected from pentaerythritol tetrakis 3-(3,5-di-tert-butyl-4-hydroxyphenyl) propionate and tris (2,4-di-tert-butyl) phosphite. Commercially available products of the antioxidant include antioxidant 1010 (i.e., pentaerythritol tetrakis 3-(3,5-di-tert-butyl-4-hydroxyphenyl) propionate) from BASF Corporation and antioxidant 168 (i.e., tris-(2,4-di-tert-butyl) phosphite) from BASF Corporation.

According to some embodiments of the present disclosure the content of the inorganic filler is 0-15% by weight, 2-15% by weight, or even 5-12% by weight, based on 100% by weight of the total weight of the thermoplastic composite. According to some embodiments of the present disclosure, the content of the compatibilizer is 5-20% by weight, 5-15% by weight, or even 6-12% by weight, based on 100% by weight of the total weight of the thermoplastic composite. According to some embodiments of the present disclosure, the content of the toughener is 0-15% by weight, 0-8% by weight, or even 2-8% by weight, based on 100% by weight of the total weight of the thermoplastic composite. According to some embodiments of the present disclosure, the content of the antioxidant is 0.1-0.5% by weight, 0.1-0.4% by weight, or even 0.2-0.3% by weight, based on 100% by weight of the total weight of the thermoplastic composite.

According to the present disclosure, the thermoplastic composite is present in the form of a pellet with an aspect ratio of 2-5, wherein the non-cellulosic organic fiber extends in the length direction of the pellet and the non-cellulosic organic fiber has a length of 5-25 mm, 8-20 mm, or even 10-12 mm.

Method for Preparing Thermoplastic Composite

According to another aspect of the present disclosure there provides a method for preparing a thermoplastic composite, comprising the steps of:

(a) melt-mixing a thermoplastic resin and hollow glass microspheres to obtain a molten mixture; and (b) mixing and impregnating non-cellulosic organic fiber with the molten mixture to obtain a thermoplastic composite containing the thermoplastic resin, the hollow glass microspheres, and the non-cellulosic organic fiber.

According to some embodiments of the present disclosure, it is possible in the step (a) that a thermoplastic resin and hollow glass microspheres are melt-mixed together with an auxiliary to obtain a molten mixture, wherein the auxiliary comprises one or more of an inorganic filler, a compatibilizer, a toughener, and an antioxidant; and in the step (b), the molten mixture and a non-cellulosic organic fiber are mixed and impregnated to obtain a thermoplastic composite containing the thermoplastic resin, the hollow glass microspheres, the auxiliary, and the non-cellulosic organic fiber.

According to some embodiments of the present disclosure, a step (c) of pulling the thermoplastic composite and cutting it into the form of pellets may be comprised after step (b).

According to some embodiments of the present disclosure, the step (a) is performed in a twin-screw extruder.

According to some embodiments of the present disclosure, a schematic method for preparing a thermoplastic composite according to the present disclosure will be specifically described below with reference to FIG. 1, wherein the mixing and extrusion of raw materials are performed in a twin-screw extruder 7, which comprises a first feeding hopper 1, a second feeding hopper 2, a plurality of areas a-i (including but not limited to areas a-i) at different temperatures, and a die 4.

The schematic method for preparing a thermoplastic composite according to the present disclosure shown in FIG. 1 comprise the steps of: preheating the twin-screw extruder 7 to a set temperature; adding a thermoplastic resin (as well as various auxiliaries) to the first feeding hopper 1 for mixing and preheating to obtain a pre-mixture; adding hollow glass microspheres to the second feeding hopper 2 to be melt-mixed with the pre-mixture so as to obtain a molten mixture; supplying a non-cellulosic organic fiber from one or more fiber supply rolls 3 to the die 4 while extruding the molten mixture into the die 4 to mix and impregnate the molten mixture and a non-cellulosic organic fiber so as to obtain an impregnated band containing the thermoplastic resin, the hollow glass microspheres, and a non-cellulosic organic fiber (as well as the auxiliaries); and cutting the impregnated band pulled from the die 4 into pellets with a desired size using a cutter 6. Alternatively, non-cellulosic organic fiber may be added into the twin screw extruder through a downstream port prior to the strand die.

Injection-Molded Product

Another aspect of the present disclosure is an injection-molded product. A further aspect of the present disclosure is an injection-molded product which has been subjected to supercritical foaming injection molding.

As for the introduction of the thermoplastic composite, see the section "Thermoplastic composite" of this specification for details.

As for the introduction of the method for preparing injection-molded products, see the section "Method for preparing injection-molded product" of this specification for details.

Method for Preparing Injection-Molded Product

According to some embodiments of the present disclosure is, a conventional injection molding process in the prior art may be employed to perform injection molding on the thermoplastic composite provided by the present disclosure. For example, an MJ-20H plastic injection molder from Chen Hsong Machinery Co. Ltd, which comprises three heating areas, may be employed to perform injection molding on the thermoplastic composite provided by the present disclosure. According to some embodiments of the present disclosure, a supercritical foaming process may be further incorporated to perform supercritical foaming injection molding on the thermoplastic composite provided by the present disclosure.

The supercritical foaming process is a foaming technique for decreasing the density of injection-molded product articles. However, the use of this process will usually lead to reduction of mechanical properties of foamed articles. Often when making lightweight polypropylene composites using supercritical foaming processes the elongation at break and the notched impact strength of materials may be reduced. The inventor of the present application found that by using the thermoplastic composite provided by the present disclosure and introducing a supercritical foaming process into the injection molding process, the density of the thermoplastic composite may be further reduced while other mechanical properties of the material, particularly the elongation at break and the notched impact strength of the material, are substantially maintained.

According to some embodiments of the present disclosure, a supercritical carbon dioxide foaming process may be incorporated to perform injection molding on the thermoplastic composite provided by the present disclosure. For example, a Mucell®-enabled Engel ES200/100TL injection molder may be employed to perform supercritical foaming injection molding on the thermoplastic composite wherein this injection molder comprises three heating areas and comprises two injection nozzle areas at its injection port.

The following embodiments are intended to be illustrative of the present disclosure and not limiting.

Embodiment 1 relates to a thermoplastic composite, comprising 35-75% by weight of a thermoplastic resin, 5-45% by weight of a non-cellulosic organic fiber, and 5-20% by weight of hollow glass microspheres, based on 100% by weight of the total weight of the thermoplastic composite.

Embodiment 2 relates to the thermoplastic composite according to embodiment 1, wherein the thermoplastic resin is one or more selected from polypropylene, polyethylene, polyvinyl chloride, polystyrene, an ethylene-vinyl acetate copolymer, an acrylonitrile-styrene-butadiene copolymer, and nylon 6.

Embodiment 3 relates to the thermoplastic composite according to embodiment 1 or 2, wherein the non-cellulosic organic fiber is one or more selected from a nylon 66 fiber, a polyethylene terephthalate fiber, a polypropylene terephthalate fiber, a polyphenylene sulfide fiber, a polyether ether ketone fiber, and an aramid fiber.

Embodiment 4 relates to the thermoplastic composite according to any of the embodiments 1-3, wherein the higher melting peak of the non-cellulosic organic fiber is 60° C. or more higher than that of the thermoplastic resin.

Embodiment 5 relates to the thermoplastic composite according to any of the embodiments 1-4, wherein the non-cellulosic organic fiber has a diameter of 5-70 μm.

Embodiment 6 relates to the thermoplastic composite according to any of the embodiments 1-5, wherein the hollow glass microspheres have a particle diameter of 5-100 μm, a density of 0.3-0.8 g/cm$^3$, and a compressive strength greater than 37.9 MPa. Embodiment 7 relates to the thermoplastic composite according to any of the embodiments 1-6, wherein the thermoplastic composite further comprises one or more of an inorganic filler, a compatibilizer, a toughener, and an antioxidant.

Embodiment 8 relates to the thermoplastic composite according to any of the embodiments 1-7, wherein the inorganic filler is one or more selected from a glass fiber, a carbon fiber, a basalt fiber, talc, and montmorillonite.

Embodiment 9 relates to the thermoplastic composite according to any of the embodiments 1-8, wherein the non-cellulosic organic fiber extends in the length direction of the pellet and the non-cellulosic organic fiber has a length of 5-25 mm.

Embodiment 10 relates to the thermoplastic composite according to any of the embodiments 1-9, wherein the thermoplastic composite comprises 15-30% by weight of the non-cellulosic organic fiber and 5-10% by weight of the hollow glass microsphere, based on 100% by weight of the total weight of the thermoplastic composite.

Embodiment 11 relates to a method for preparing a thermoplastic composite, comprising the steps of: (a) melt-mixing a thermoplastic resin and hollow glass microspheres to obtain a molten mixture; and (b) mixing and impregnating non-cellulosic organic fiber with the molten mixture to obtain a thermoplastic composite containing the thermoplastic resin, the hollow glass microspheres, and the non-cellulosic organic fiber.

Embodiment 12 relates to the method according to embodiment 11, wherein the thermoplastic resin is one or more selected from polypropylene, polyethylene, polyvinyl chloride, polystyrene, an ethylene-vinyl acetate copolymer, an acrylonitrile-styrene-butadiene copolymer, and nylon 6.

Embodiment 13 relates to the method according to embodiment 11 or 12, wherein the non-cellulosic organic fiber is one or more selected from a nylon 66 fiber, a polyethylene terephthalate fiber, a polypropylene terephthalate fiber, a polyphenylene sulfide fiber, a polyether ether ketone fiber, and an aramid fiber.

Embodiment 14 relates to the method according to any of the embodiments 11-13, wherein the higher melting peak of the non-cellulosic organic fiber is 60° C. or more higher than that of the thermoplastic resin.

Embodiment 15 relates to the thermoplastic composite according to any of the embodiments 11-14, wherein the non-cellulosic organic fiber has a diameter of 5-70 μm.

Embodiment 16 relates to the method according to any of the embodiments 11-15, wherein the hollow glass microspheres have a particle diameter of 5-100 μm, a density of 0.3-0.8 g/cm$^3$, and a compressive strength greater than 37.9 MPa.

Embodiment 17 relates to the method according to any of the embodiments 11-16, wherein in the step (a), a thermoplastic resin and hollow glass microspheres are melt-mixed together with an auxiliary to obtain a molten mixture, wherein the auxiliary comprises one or more of an inorganic filler, a compatibilizer, a toughener, and an antioxidant; and in the step (b), the molten mixture and a non-cellulosic organic fiber are mixed and impregnated to obtain a thermoplastic composite containing the thermoplastic resin, the hollow glass microspheres, the auxiliary, and the non-cellulosic organic fiber.

Embodiment 18 relates to the method according to the embodiment 17, wherein the inorganic filler is one or more selected from a glass fiber, a carbon fiber, a basalt fiber, talc, and montmorillonite.

Embodiment 19 relates to the method according to any of the embodiments 11-18, wherein the step (a) is performed in a twin-screw extruder.

Embodiment 20 relates to the method according to ny of the embodiments 11-19, wherein a step (c) of pulling the thermoplastic composite and cutting it into the form of pellets may be comprised after step (b).

Embodiment 21 relates to an injection-molded product, comprising the thermoplastic composite according to any of the embodiments 1-10 which has been subjected to injection molding.

Embodiment 22 relates to the injection-molded product according to the embodiment 21, which has been subjected to supercritical foaming injection molding.

Embodiment 23 relates to the injection-molded product according to the embodiment 22, wherein the supercritical foaming injection molding is supercritical carbon dioxide foaming injection molding.

EXAMPLES

Examples are provided below, but it is to be emphasized that the scope of the present disclosure is not limited to the following examples. All parts and percentages are by weight, unless specified otherwise.

The raw materials that were employed in Examples and Comparative Examples are shown in the following Table 1.

TABLE 1

| Trade Designation | Chemical Description | Function | Suppliers |
|---|---|---|---|
| PPK9026 | Polypropylene resin | Thermoplastic resin | Sinopec Limited, China |
| PP 3015 | Polypropylene resin | Thermoplastic resin | Formosa Chemicals&Fibre Corporation, Taiwan |
| PP 3920 | Polypropylene resin | Thermoplastic resin | SK Corporation, South Korea |
| PP K2051 | Polypropylene resin | Thermoplastic resin | Formosa Plastics Corporation, Taiwan |
| Dowlex IP-41 | High Density Polyethylene resin | Thermoplastic resin | Dow Corporation, Midland, MI, USA |
| Dow chemical 8842 | Polyolefin elastomer | Toughener | Dow Corporation, Midland, MI, USA |
| LDPE-2003 | Low Density Polyethylene | Toughener | Sinopec Limited, China |
| E018T | Polypropylene grafted maleic anhydride | Compatibilizer | Shanghai Yuanyuan Polymer Co., Ltd. |
| Antioxidant 1010 | Tetrakis 3-(3,5-di-tert-butyl-4-hydroxyphenyl) propionate | Antioxidant | BASF Corporation, Ludwigshafen, Germany |
| Antioxidant 168 | Tris (2,4-di-tert-butyl) phosphite | Antioxidant | BASF Corporation, Ludwigshafen, Germany |
| PA (Nylon) 66 fiber | Nylon 66 polyamide fiber without surface modificaiton, having an average diameter of 15-20 μm | Non-cellulosic organic fiber | Invista Ltd., China |
| E-Glass Assembled Roving for Thermoplastics 988A | Alkali-free glass fiber with an average diameter of 14 μm | Inorganic filler | Jushi Group Ltd., Tongxiang City, China |
| LS 056 | Polyethyelene terepthalate fiber with an average diameter of 20 μm | Non-cellulosic organic fiber | Jiangsu Hengli Chemical Fibre Co., Ltd. |

TABLE 1-continued

| Trade Designation | Chemical Description | Function | Suppliers |
|---|---|---|---|
| iM16k | Hollow glass microspheres with an average diameter of 20 μm, and density of 0.46 g/cm3, and a compressive stength of 113.8 MPa | Hollow glass microspheres | 3M Corporation, St.Paul, MN |
| KBM-903 | Silane coupler | Hollow glass microsphere surface modifier | Shin-Etsu Corporation, Tokyo, Japan |
| Hostacom TRC 787N E | Impact resistant mineral filled polypropylene composite particles | Thermoplastic resin | LyondellBasell Corporation, Houston, TX, USA |

The general injection molding process (used in all examples and comparative examples in Table 7) and supercritical injection molding process (used in all examples and comparative examples of Table 8) are described below.

General Injection Molding Process

An MJ-20H plastic injection molder from Chen Hsong Machinery Co. Ltd, China with three heating areas, was used to perform injection molding on the thermoplastic composites of Examples 1-11 and Comparative Examples 1-3. Process parameters are shown in Table 2

TABLE 2

| | Temperature of injection nozzle (° C.) | Temperature of heating area 1 (° C.) | Temperature of heating area 2 (° C.) | Temperature of heating area 3 (° C.) | Melt Pressure (Mpa) | Cooling time (s) | Temperature of the die (° C.) |
|---|---|---|---|---|---|---|---|
| Example 10 | 165 | 165 | 160 | 160 | 5 | 15 | 40 |
| Comparative Example 2 | 215 | 215 | 210 | 200 | 5 | 15 | 40 |
| Examples 1-9 Example 11 Comparative Example 1 Comparative Example 3 | 200 | 200 | 195 | 195 | 5 | 15 | 40 |

A Mucell®-enabled Engel ES200/100TL injection molder with three heating zones and two injection nozzle areas at its injection port was used to perform injection molding on the thermoplastic composites of Example 16 and Comparative Example 4 with supercritical fluid dosing into the barrel of the injection molding machine turned off Process parameters were shown in Table 4.

Test specimens were molded in the Mucell®-enabled Engel injection molding machine with the specifications shown below using a mold to obtain ASTM Type I tensile test specimens (as described in ASTM D638-10: Standard Test Method for Tensile Properties of Plastics).

TABLE 3

| Injection Molding Machine | |
|---|---|
| Model No | ES200/100TL |
| Serial No-Ton-year | 70703/100/01 |
| Manufacture Date | 01/2001 |
| Manufactured by | Engel Canada, Inc. Guelph, Ontario, Canada |
| SCF system Model # | TR 3.5000G |
| SCF System Serial No | 00.41 |

TABLE 4

| | Temperature of injection nozzle 1 | Temperature of injection nozzle 2 | Temperature of heating area 1 | Temperature of heating area 2 | Temperature of heating area 3 | Melt Pressure (MPa) | Cooling time (s) | Rotation speed of screws (rpm) | Temperature of the die (° C.) |
|---|---|---|---|---|---|---|---|---|---|
| Example 16 | 200 | 200 | 200 | 196 | 190 | 12.4 | 25 | 30 | 79 |
| Comparative Example 4 | 240 | 221 | 221 | 196 | 187 | 138 | 50 | 30 | 20 |

Supercritical Injection Molding Process

A Mucell®-enabled Engel ES200/100TL injection molder with three heating zones and two injection nozzle areas at its injection port was used to perform injection molding on the thermoplastic composites of Example 12-15 and Comparative Example 5 and 6. Process parameters are shown in Table 5.

For all these examples and comparatives the flow rate of carbon dioxide was 0.23 kg/hr (0.5 lb/hr) and the feeding time was 3.2 seconds.

Test specimens were molded in the Mucell®-enabled Engel injection molding machine with the specifications shown in the above "Injection Molding Machine" table using a mold to obtain ASTM Type I tensile test specimens (as described in ASTM D638-10: Standard Test Method for Tensile Properties of Plastics).

pendulum impact testing machine (Shenzhen Wance Testing Machine Co., Ltd.) with an impact hammer of 2.75 J.

The density of the injection-molded product, with a unit of $g/cm^3$, was obtained by dividing the weight of the resultant injection-molded product by the volume according to ASTM D792 using a METTLER TOLEDO A1204 density balance (Toledo, Ohio).

Test Methods for Examples 12-16 and Counter Examples 4-6

Density of the injection molded parts was measured from the known weight of the injection molded parts divided by the volume of the specimens. The volume of the specimens was determined from the known molded weight of unfilled homopolymer polypropylene "Profax" 6523 from Lyondell-

TABLE 5

|  | Temperature of injection nozzle 1 (° C.) | Temperature of injection nozzle 2 (° C.) | Temperature of heating area 1 (° C.) | Temperature of heating area 2 (° C.) | Temperature of heating area 3 (° C.) | Melt Pressure (Mpa) | Cooling time (s) | Rotation speed of screws (rpm) | Temperature of the die (° C.) |
|---|---|---|---|---|---|---|---|---|---|
| Examples 12-15 | 200 | 200 | 200 | 196 | 190 | 12.4 | 25 | 30 | 18 |
| Comparative Examples 5-6 | 240 | 221 | 221 | 196 | 187 | 138 | 50 | 30 | 20 |

Test Methods for Examples 1-11 and Counter Examples 1-3

Various property tests were performed on the injection-molded products to evaluate physical properties including flexural modulus, elongation at break, notched impact strength and density. The flexural modulus was evaluated according to ASTM D-790, the elongation at break was evaluated according to ASTM D-638 and the notched impact strength was evaluated according to ASTM D-256. Specifically, a standard injection-molded sample bar per each ASTM with a thickness of 3.2 mm was placed in an environment at a temperature of 20° C. and a humidity of 50% for 48 hours. Then for the flexural modulus and elongation at break the tests were performed on an Instron 5969 (Norwood, Mass.) universal testing machine. The notched impact test was performed on a Model PIT550A-2

Basell and its known density (0.9 g/cc) as measured by Micromeritics AccuPyc 1330 Gas Pycnometer in a 10 cc cup using helium gas as the displacement medium. An Instron frame with a 50 kN load cell and tensile and 3 point bending grips were used for tensile elongation and flexural modulus properties, respectively. In tensile testing mode, the test procedure described in ASTM D-638 standard was followed, however no strain gauge was used, and instead, grip separation distance was used to determine the sample elongation. The flexural modulus was measured using a modified version of ASTM D-790 three point bending test where the test specimens used were ASTM type 1 test specimens typically used in ASTM D-638. Tinius Olsen model IT503 impact tester and its specimen notcher were used to measure room temperature Notched Izod impact strength of the molded parts according to ASTM D-256.

TABLE 6

| Example | iM16K Hollow glass microsphere | PP Blend 1 | PA66 Non-cellulosic organic fiber | 988A Glass fiber | LS 056 Non-cellulosic organic fiber | Dow Chemical 8842 toughner | IP-41 Thermoplastic resin | TRC 787NE Thermoplastic composite |
|---|---|---|---|---|---|---|---|---|
| EX 1 | 10 | 68 | 10 | 0 | 0 | 2 | 0 | 0 |
| EX 2 | 10 | 63 | 15 | 0 | 0 | 2 | 0 | 0 |
| EX 3 | 10 | 58 | 20 | 0 | 0 | 2 | 0 | 0 |
| EX 4 | 10 | 48 | 30 | 0 | 0 | 2 | 0 | 0 |
| EX 5 | 10 | 38 | 40 | 0 | 0 | 2 | 0 | 0 |
| EX 6 | 5 | 63 | 20 | 0 | 0 | 2 | 0 | 0 |
| EX 7 | 15 | 53 | 20 | 0 | 0 | 2 | 0 | 0 |
| EX 8 | 10 | 58 | 20 | 0 | 0 | 2 | 0 | 0 |
| EX 9 | 10 | 51 | 20 | 7 | 0 | 2 | 0 | 0 |
| EX 10 | 10 | 0 | 20 | 0 | 0 | 8 | 52 | 0 |
| EX 11 | 10 | 58 | 0 | 0 | 20 | 2 | 0 | 0 |
| CE1 | 10 | 78 | 0 | 0 | 0 | 2 | 0 | 0 |
| CE2 | 10 | 58 | 0 | 20 | 0 | 2 | 0 | 0 |
| CE3 | 0 | 68 | 20 | 0 | 0 | 2 | 0 | 0 |
| EX 12 | 10 | *55 | 23 | 0 | 0 | 2.5 | 0 | 0 |
| EX 13 | 10 | *55 | 23 | 0 | 0 | 2.5 | 0 | 0 |

TABLE 6-continued

| Example | iM16K Hollow glass microsphere | PP Blend 1 | PA66 Non-cellulosic organic fiber | 988A Glass fiber | LS 056 Non-cellulosic organic fiber | Dow Chemical 8842 toughner | IP-41 Thermoplastic resin | TRC 787NE Thermoplastic composite |
|---|---|---|---|---|---|---|---|---|
| EX14 | 10 | *55 | 23 | 0 | 0 | 2.5 | 0 | 0 |
| EX 15 | 10 | *55 | 23 | 0 | 0 | 2.5 | 0 | 0 |
| EX 16 | 10 | *55 | 23 | 0 | 0 | 2.5 | 0 | 0 |
| CE4 | 0 | 0 | 0 | 0 | 0 | 0 | 0 | 100 |
| CE5 | 0 | 0 | 0 | 0 | 0 | 0 | 0 | 100 |
| CE6 | 0 | 0 | 0 | 0 | 0 | 0 | 0 | 100 |

*EX12-EX16 used a slightly different PP blend 2 of 50 parts by weight of PPK9026, 20 parts by weight of PP3920 and 10 parts by weight of PP K2051.
All formulations used 3 weight % 2003 LDPE except Example 12-16 which used 2.5 weight %.
All formulations used 7 weight % PP-MAH and 0.3 weight % of a 3:1 antioxidant blend of 1010:168 except CE4-6.

Example 1 iM16k hollow glass microspheres and PA (Nylon) 66 fiber were both dried at 120° C. for 2 hours.

32 parts by weight of PPK9026, 35 parts by weight of PP3015, 25 parts by weight of PP3920, and 8 parts by weight of PP K2051 were mixed in barrel at 20° C. to obtain a thermoplastic resin blend referred to as "PP Blend 1".

A twin-screw extruder (TDM20) made by Guangzhou POTOP Co. Ltd as shown in FIG. 1 was preheated to set temperatures, wherein the set temperatures of respective areas (areas a-i) from the first feeding hopper to the die were respectively: 150° C., 210° C., 215° C., 210° C., 210° C., 210° C., 205° C., 205° C., and 205° C., in this order.

68 parts by weight of the "PP Blend 1" and 2 parts by weight of Dow chemical 8842, 3 parts by weight of polyethylene, 7 parts by weight of PP-MAH and 0.3 parts by weight of an antioxidant (wherein the weight ratio of antioxidant 1010 to antioxidant 168 in the antioxidant was 3:1) were added to the first feeding hopper for mixing to obtain a pre-mixture.

10 parts by weight of iM16k hollow glass microspheres were added to the second feeding hopper.

The twin-screw extruder was started to allow the melt mixing of 10 parts by weight of iM16k hollow glass microspheres and 80.3 parts by weight of the pre-mixture at 200° C. so that a molten mixture was obtained.

10 parts by weight of PA (Nylon) 66 fiber, in the form of a bundle, were supplied from a fiber supply roll to a die at a temperature of 205° C., while 90.3 parts by weight of the molten mixture were extruded into the die so as to obtain a composite fiber. The compositewas pulled to a cutter at a rate of 1.5 m/min and was cut into pellets with a length of 10-12 mm and dried.

The pellets had the composition shown in Table 6 The pellets were made into test sample bars according to the "General Injection Molding Process" and the test sample bars were tested according to the "Test Methods" The test results are shown in Table 7.

Examples 2-5

Examples 2-5 were made and tested identically to Example 1 except that the PA (Nylon) 66 fiber was increased and the PP Blend 1 was decreased as per Table 6.

Examples 6-7

Examples 6 and 7 were made and tested identically to Examples 1-5 except that the amount of hollow glass microspheres was changed (and compensated for by PP Blend 1 as per Table 6)

Example 8

This example demonstrates an alternative process of blending pellets with and without hollow glass microspheres. iM16k hollow glass microspheres and PA (Nylon) 66 fiber were both dried at 120° C. for 2 hours.

32 parts by weight of PPK9026, 35 parts by weight of PP3015, 25 parts by weight of PP3920, and 8 parts by weight of PP K2051 were mixed to obtain a thermoplastic resin.

58 parts by weight of the thermoplastic resin and 2 parts by weight of DOW CHEMICAL 8842, 3 parts by weight of polyethylene, 7 parts by weight of PP-MAH and 0.3 parts by weight of an antioxidant (wherein the weight ratio of antioxidant 1010 to antioxidant 168 in the antioxidant was 3:1) were mixed to obtain a pre-mixture. The pre-mixture is divided into two aliquots to obtain a pre-mixture 1 and a pre-mixture 2.

The twin-screw extruders (TDM20) made by Guangzhou POTOP Co. Ltd was preheated to set temperatures, wherein the set temperatures of respective areas (areas a-i) from the first feeding hopper to the die were respectively: 150° C., 210° C., 215° C., 210° C., 210° C., 210° C., 205° C., 205° C., and 205° C., in this order.

The pre-mixture 1 was added to the first feeding hopper of the first twin-screw extruder. The first twin-screw extruder was started to allow the melt mixing of 35.15 parts by weight of the pre-mixture 1 at 200° C. so that a molten mixture 1 was obtained. 20 parts by weight of PA (Nylon) 66 fiber, in the form of a bundle, were supplied from a fiber supply roll to a die at a temperature of 205° C. 35.15 parts by weight of the molten mixture 1 were extruded into the die to mix and impregnate the fiber. The impregnated fiber composite was pulled to a cutter at a rate of 1.5 m/min and was cut into pellets (without hollow glass micropsheres) with a length of 10-12 mm by the cutter and was then dried for further use.

The pre-mixture 2 was added to the first feeding hopper of the second twin-screw extruder. iM16k hollow glass microspheres were added to the second feeding hopper of the second twin-screw extruder. The second twin-screw extruder was started to allow the melt mixing of 10 parts by weight of iM16k hollow glass microspheres and 35.15 parts by weight of the pre-mixture 2 at 205° C. so that a molten mixture 2 was obtained. 45.15 parts by weight of the molten mixture 2 were cut into pellets (with hollow glass microspheres) with a length of 10-12 mm and was dried for further use.

The pellets with and without hollow glass microspheres were mixed at 20° C. to produce the composition shown in Table 6. The mixture was produced into test sample bars according to the "General Injection Molding Process" and the test sample bars were tested according to the "Test Methods". The test results are shown in Table 7.

Example 9

This example was made and tested identically to Examples 1-5 except that 988A glass fiber was fed into the die along with the PA (Nylon) 66 fiber with amounts as per Table 6.

Example 10

This example was made and tested identically to Examples 1-5 except that more POE toughner was used and a different thermoplastic resin was used (Dowlex IP_41) as shown in Table 6.

Example 11

This example was made and tested identically to Examples 1-5 except that the PA (Nylon) 66 fiber was replaced with a different non-cellulosic organic fiber LS 056 with amounts shown in Table 6

Comparative Example 1

This comparative example was done identically as Examples 1-5 except that NO fibers were used and the hollow glass microspheres were pretreated with silane with formulation amounts per Table 6. KBM-903 silane coupler was used to surface treat iM16k hollow glass microspheres. then stirred

Comparative Example 2

This comparative example was done identically as Examples 1-5 with formulation amounts as per Table 6 except that NO non-cellulosic organic fibers were used and 988A GLASS fibers were used instead.

Comparative Example 3

This comparative example was done identically as Examples 1-5 with formulation amounts as per Table 6 except that NO hollow glass microspheres were used. 6.

TABLE 7

| | Flexural modulus (MPa) | Elongation at break (%) | Notched impact strength (KJ/m$^2$) | Density (g/cm$^3$) |
|---|---|---|---|---|
| Example 1 | 1780 | 16.8 | 24.5 | 0.841 |
| Example 2 | 1930 | 20.5 | 35.9 | 0.853 |
| Example 3 | 2180 | 23.6 | 42.8 | 0.879 |
| Example 4 | 2310 | 20.4 | 44.6 | 0.899 |
| Example 5 | 1970 | 17.1 | 42.2 | 0.914 |
| Example 6 | 1890 | 24.6 | 48.1 | 0.893 |
| Example 7 | 2140 | 13.4 | 31.5 | 0.867 |
| Example 8 | 2100 | 18.9 | 39.6 | 0.881 |
| Example 9 | 2420 | 7.2 | 26.7 | 0.902 |

TABLE 7-continued

| | Flexural modulus (MPa) | Elongation at break (%) | Notched impact strength (KJ/m$^2$) | Density (g/cm$^3$) |
|---|---|---|---|---|
| Example 10 | 1360 | 14.5 | 16.8 | 0.920 |
| Example 11 | 1980 | 17.3 | 39.4 | 0.891 |
| Comparative Example 1 | 1780 | 4.7 | 7.4 | 0.829 |
| Comparative Example 2 | 4360 | 4.6 | 23.3 | 1.021 |
| Comparative Example 3 | 1650 | 26.8 | 59.5 | 0.952 |

From Examples 1-11 and Comparative Examples 1-3, it can be seen that it is difficult to balance the relationships among low density, high modulus (high rigidity), and high toughness, either by surface treatment on glass microspheres or by the enhancement with non-cellulosic inorganic fiber materials. Only when hollow glass microspheres and non-cellulosic organic fibers are impregnated with the thermoplastic resin e according to specific formulations can a thermoplastic composite with high modulus (high rigidity), high toughness, and low density be prepared.

Property preferences for the thermoplastic composites are density less than 0.95 g/cm$^3$, flexural modulus greater than or equal to 1700 MPa, notched impact strength greater than or equal to 24 KJ/m$^2$ and elongation at break greater than or equal to 12%

In addition, from Examples 2-4, it can be seen that when the content of hollow glass microspheres is 10% by weight and the content of non-cellulosic organic fiber is 15-30% by weight in a thermoplastic polypropylene composite, the injection-molded products have good mechanical properties and have the features of high modulus (high rigidity), high toughness, and low density.

From Comparative Example 1, it can be seen that an injection-molded product of a thermoplastic polypropylene composite with no organic fiber obtained by treating glass microspheres with a silane coupler, has an insufficient toughness.

From Comparative Example 2, it can be seen that an injection-molded product prepared using a glass fiber reinforced thermoplastic polypropylene composite without hollow glass microspheres has excessively high density.

From Comparative Example 3, it can be seen that an injection-molded product prepared form a thermoplastic polypropylene composite by using only a non-cellulosic organic fiber has insufficient rigidity and relatively high density.

Examples 12-16

These examples were made identically to Examples 1-5 but with amounts shown in Table 6 using a slightly different thermoplastic resin PP blend as indicated in Table 6.

In these examples, however, the dried pellets were injected molded using an injection molder (ES200/100TL, Mucell®-enabled Engel) with the function of supercritical foaming. Examples 12-15 used the supercritical foaming function whereas Example was not supercritically foamed. The temperature gradient of injection molder temperatures from a feeding port to an injection port was 18° C., 190° C., 196° C., 200° C., 200° C., and 200° C.) so that the pellets were formed into test sample bars, wherein the weight reduction ratio of the material was controlled by the shot size in the mold cavity. The weight reduction ratio was 6.2% by weight for Example 12, 7.5% for Example 13. 9.3% for Example 14 and 13.5% for Example 15. The test sample bars were tested according to the "Test Methods". The test results are shown in Table 8.

Comparative Example 4

Injection-molded test sample bars were prepared with parameters in Table 4 and amounts as in Table 6 using Hostacom TRC 787N E thermoplastic composite in place of the PP blend and with NO fibers and NO hollow glass microspheres.

Comparative Example 5

Injection-molded test sample bars were prepared with parameters in Table 5 and amounts as in Table 6 using Hostacom TRC 787N E thermoplastic composite in place of the PP blend and with NO fibers and NO hollow glass microspheres. The amount of supercritical $CO_2$ foaming was controlled to 11.7% by weight. Formulation amounts are shown in Table 6.

Comparative Example 6

Injection-molded test sample bars were prepared as in Comparative Example 5 but the amount of supercritical $CO_2$ foaming was controlled to 12.9% by weight.

TABLE 8

|  | Example 12 | Example 13 | Example 14 | Example 15 | Example 16 | Comparative Example 4 | Comparative Example 5 | Comparative Example 6 |
|---|---|---|---|---|---|---|---|---|
| Supercritical foaming | YES | YES | YES | YES | NO | NO | YES | YES |
| Notched impact strength (KJ/m$^2$) | 51.4 | 49.8 | 55.1 | 56.1 | 52.4 | 61.5 | 21.1 | 23.4 |
| Flexural modulus (MPa) | 1373 | 1340 | 1317 | 1242 | 1313 | 1661 | 1690 | 1690 |
| Density (g/cm$^3$) | 0.825 | 0.814 | 0.798 | 0.754 | 0.880 | 1.030 | 0.911 | 0.898 |

From Examples 12-15, it can be seen that the injection-molded products, prepared by employing thermoplastic composites provided by the present disclosure and using the supercritical foaming process, substantially maintain the flexural modulus and the notched impact strength of the injection-molded products while the density is further reduced.

From Comparative Examples 4-6, it can be seen that when the injection-molded products were prepared by employing other polypropylene composites and using the supercritical foaming process, the notched impact strength has been significantly reduced.

In summary, the injection-molded products prepared from the thermoplastic composite according to the present disclosure further using the supercritical foaming process is even more advantageous in preparing a composite with good mechanical properties and light weight.

It should be understood by the person skilled in the art that various modifications and variations can be made without departing from the scope of the present disclosure. Such modifications and variations are intended to fall in the scope of the present disclosure defined by the following appended claims.

What is claimed is:

1. An injection-molded product comprising a thermoplastic composite which has been subjected to supercritical foaming injection molding; wherein the thermoplastic composite comprises 35-75% by weight of a thermoplastic resin, 5-45% by weight of a non-cellulosic organic fiber, and 5-20% by weight of hollow glass microspheres, based on 100% by weight of the total weight of the thermoplastic composite.

2. The injection-molded product according to claim 1, wherein the thermoplastic resin is one or more selected from polypropylene, polyethylene, polyvinyl chloride, polystyrene, an ethylene-vinyl acetate copolymer, an acrylonitrile-styrene-butadiene copolymer, and nylon 6.

3. The injection-molded product according to claim 1, wherein the non-cellulosic organic fiber is one or more selected from a nylon 66 fiber, a polyethylene terephthalate fiber, a polypropylene terephthalate fiber, a polyphenylene sulfide fiber, a polyether ether ketone fiber, and an aramid fiber.

4. The injection-molded product according to claim 1, wherein the higher melting peak of the non-cellulosic organic fiber is 60° C. or more higher than that of the thermoplastic resin.

5. The injection-molded product according to claim 1, wherein the non-cellulosic organic fiber has a diameter of 5-70 μm.

6. The injection-molded product according to claim 1, wherein the hollow glass microspheres have a particle diameter of 5-100 μm, a density of 0.3-0.8 g/cm$^3$, and a compressive strength greater than 37.9 MPa.

7. The injection-molded product according to claim 1, wherein the thermoplastic composite further comprises one or more of an inorganic filler, a compatibilizer, a toughener, and an antioxidant.

8. The injection-molded product according to claim 7, wherein the inorganic filler is one or more selected from a glass fiber, a carbon fiber, a basalt fiber, talc, and montmorillonite.

9. The injection-molded product according to claim 1, wherein the thermoplastic composite comprises 15-30% by weight of the non-cellulosic organic fiber and 5-10% by weight of the hollow glass microsphere, based on 100% by weight of the total weight of the thermoplastic composite.

10. The injection-molded product according to claim 2, wherein the thermoplastic resin is one or more selected from polypropylene, polyethylene, polyvinyl chloride, polystyrene, an ethylene-vinyl acetate copolymer, an acrylonitrile-styrene-butadiene copolymer, and nylon 6.

11. The injection-molded product according to claim 10, wherein, the thermoplastic resin is one or more selected from polypropylene and polyethylene.

12. The injection-molded product according to claim 11, wherein the non-cellulosic organic fiber is one or more selected from a nylon 66 fiber, a polyethylene terephthalate fiber, and a polypropylene terephthalate fiber.

13. The injection-molded product according to claim 10, wherein the non-cellulosic organic fiber is one or more selected from a nylon 66 fiber, a polyethylene terephthalate fiber, and a polypropylene terephthalate fiber.

* * * * *